United States Patent [19]

Chevance et al.

[11] Patent Number: 4,770,055
[45] Date of Patent: Sep. 13, 1988

[54] TORQUE SHOCK ABSORBING DEVICE IN AN ELECTRICAL MOTOR-SPEED REDUCER UNIT FOR DRIVING ACCESSORIES IN MOTOR VEHICLES

[75] Inventors: Claude Chevance, Savigny-sur-Orge; Thierry Pebre, Paris, both of France

[73] Assignee: Compagnie Industrielle de Mecanismes en abrege C.I.M., France

[21] Appl. No.: 912,017

[22] Filed: Sep. 26, 1986

[30] Foreign Application Priority Data

Sep. 26, 1985 [FR] France .................................. 85 14292

[51] Int. Cl.$^4$ .......................... F16H 57/00; F16H 1/16
[52] U.S. Cl. ........................................ 74/411; 74/425; 464/160
[58] Field of Search ................... 74/411, 425; 192/56; 464/30, 37, 83, 160, DIG. 902

[56] References Cited

U.S. PATENT DOCUMENTS

| | | | |
|---|---|---|---|
| 1,325,464 | 12/1919 | Decker | 464/37 |
| 2,344,673 | 3/1944 | Brown | 464/37 |
| 2,668,426 | 2/1954 | Hoover | 464/37 |
| 2,692,486 | 10/1954 | Anderson | 464/37 |
| 2,826,903 | 3/1958 | Gerstung et al. | 464/37 |
| 3,208,298 | 9/1965 | Pickles | 74/411 |
| 3,554,045 | 1/1971 | Littmann | 74/411 |
| 3,635,100 | 1/1972 | Littmann | 74/425 |
| 3,789,690 | 2/1974 | Droske | 74/425 |
| 4,279,528 | 7/1981 | Mangiayacchi et al. | 464/902 |
| 4,300,363 | 11/1981 | Mathues | 464/160 |
| 4,364,281 | 12/1982 | Wunsch | 74/55 |
| 4,392,635 | 7/1983 | Muessel et al. | 464/902 |
| 4,559,838 | 12/1985 | Neuenschwander | 74/569 |

*Primary Examiner*—Lawrence Staab

[57] ABSTRACT

The device comprises a worm wheel (1) driven in rotation by a worm (2) coupled to the output shaft (3) of a motor-speed reducer (4), a gear pinion (5) associated with the worm wheel (1) for driving the accessory, and means interposed between the gear pinion (5) and the worm wheel (1) for absorbing the driving torque of the worm wheel when the accessory reaches the end of its travel and stops the rotation of the pinion (5). The shock absorbing means comprise a cam (6) fixed to the pinion (5) and having two opposed surfaces (6a, 6b), a pair of shoes (7a, 7b) in bearing relation to the surfaces (6a, 6b) of the cam and biased thereagainst by a metal spring (8) coaxial with the pinion (5) and the worm wheel (1) and surrounding the shoes, and elements (9a, 9b) drivenly connected to the worm wheel and transmitting to the shoes and to the cam and gear pinion the driving torque of the worm wheel. This arrangement renders the shock absorbing device insensitive to variations in temperature and avoids any play after a certain period of use.

2 Claims, 4 Drawing Sheets

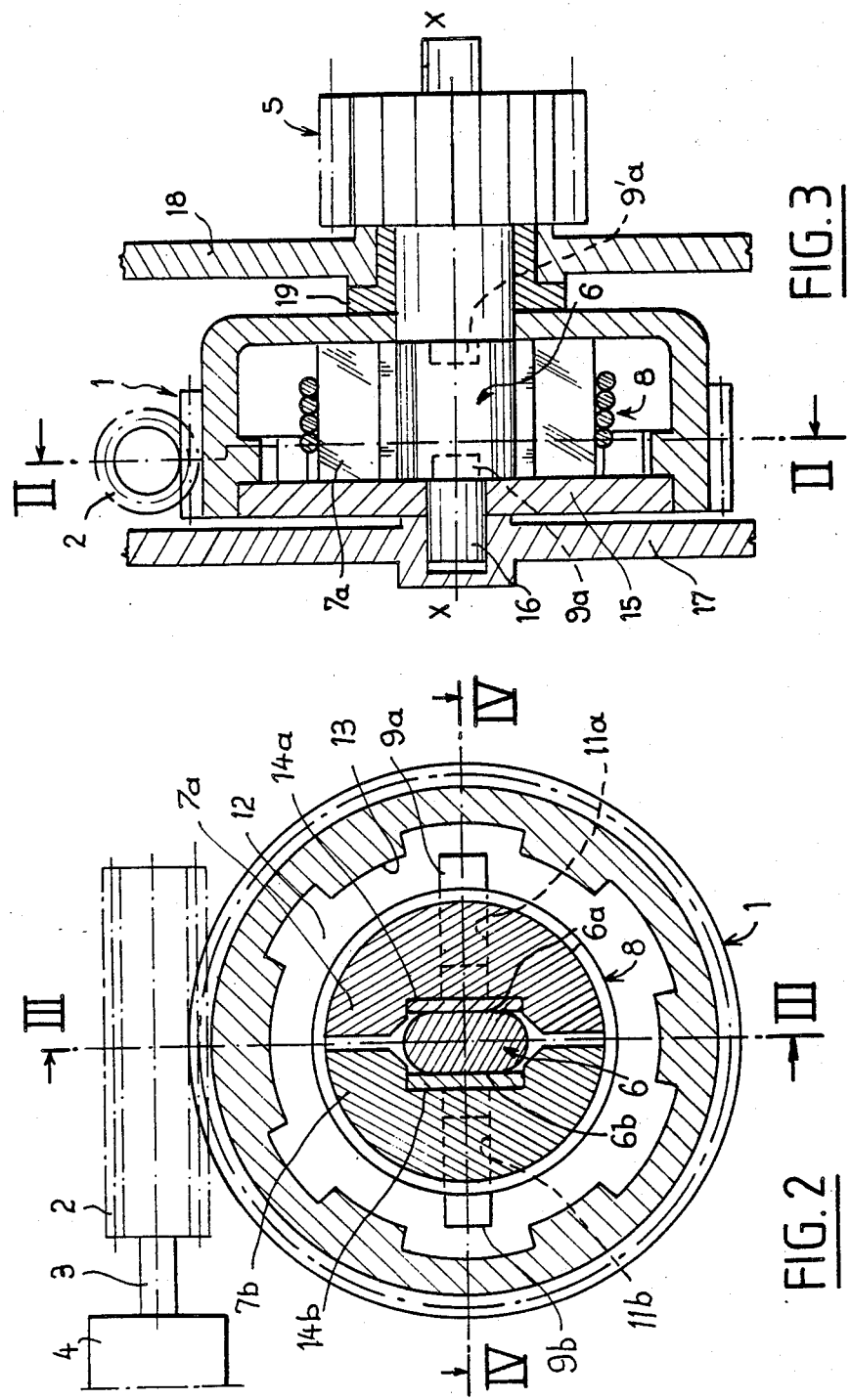

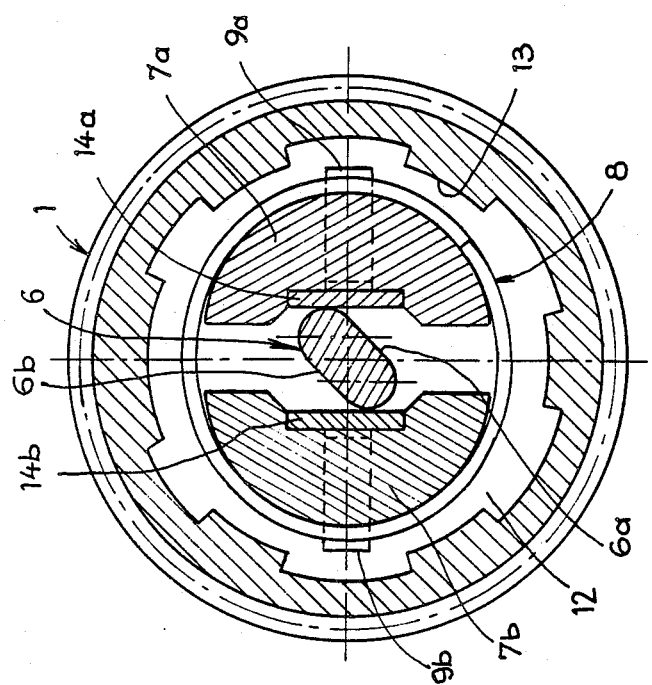
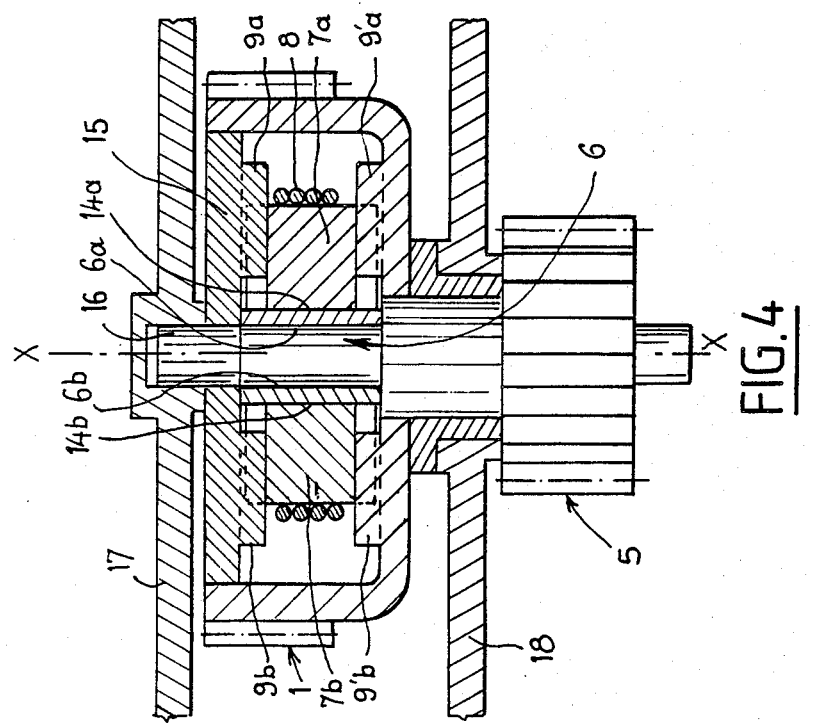
FIG. 5
FIG. 4

TORQUE SHOCK ABSORBING DEVICE IN AN ELECTRICAL MOTOR-SPEED REDUCER UNIT FOR DRIVING ACCESSORIES IN MOTOR VEHICLES

The present invention relates to a torque shock absorbing device in an electrical motor-speed reducer unit for driving accessories in motor vehicles and in particular window glasses.

This type of accessory driving system comprises a worm wheel driven in rotation by a worm coupled to the output shaft of the motor-speed reducer unit, a gear pinion associated with the worm wheel for driving the accessory, and means interposed between the pinion and the worm wheel for absorbing the shock produced by the driving torque of the wheel when the accessory reaches an end-of-travel abutment and stops the rotation of the pinion.

Indeed, it is known that the electrical glass raising motor-speed reducer units operate with an upper abutment and a lower abutment without the use of an end-of-travel switch. Consequently, the kinetic energy of the armature must be absorbed by a shock absorbing system which is usually located between the worm wheel and the hub of the speed reducer unit.

All presently-known shock absorbing systems comprise blocks made from either a plastomer (polyurethane) or an elastomer (nitrile rubber).

Further, the motor-speed reducer units employed are irreversible so that the vibrations of the vehicle cannot cause the window glass to descend and so that the latter cannot be opened by bearing thereagainst, for safety reasons.

When the window glass is fully opened, the torque shock absorber consequently remains under compression and, after a certain period of use, there is a deformation of the shock absorbing blocks and consequently an end-of-travel play for the glass. Moreover, in the case where a door panel must receive an added layer of paint or the system is subjected for a certain time to a high ambient temperature (from +80° C. to +125° C.), the material of the torque shock absorber undergoes creep so that, when reversing the direction of movement, there is an angular play on the output gear pinion of the motor-speed reducer unit equivalent to this creep, and moreover the shock absorbing qualities diminish. The following drawbacks also result: first of all, the window glass moves downwardly, the extent of this movement being limited by the specifications of the constructors. Further, the shock absorber is shorter, and therefore less effective, this defect being liable to result in the breakage of the mechanism.

The elastomer and plastomer shock absorbers also have the drawback residing in the variations in the Shore hardness as a function of the ambient temperature: thus, at −30° C., the hardness increases substantially and the effectiveness of the shock absorber becomes distinctly less satisfactory.

An object of the invention is to provide a torque shock absorber which avoids these drawbacks.

The invention therefore provides shock absorbing means comprising a cam fixed to the end of the gear pinion adjacent to the worm wheel and having two opposed surfaces, a pair of shoes disposed in bearing relation to the surfaces of the cam and maintained against said surfaces by an annular metal spring coaxial with the gear pinion and the worm wheel and surrounding said shoes, and elements connected to the wheel and cooperative with the shoes so as to transmit to the latter and to the cam and gear pinion the driving torque of the worm wheel in such manner that, when the gear pinion and the cam are prevented from rotating at the end of the travel of the accessory, the torque transmitted to the shoes obliges the latter to radially spread apart while expanding the spring and bearing against the cam.

The frictions in this shock absorbing system are such that the low efficiency absorbs a part of the energy at the moment of the absorption of the shock, while, inversely, the return to the initial position is effected under very different conditions of efficiency.

This shock absorber has, in addition to other advantages, the advantage of being completely insensitive to variations of temperature owing to the use of a metal spring.

Further features and advantages of the invention will appear from the following description with reference to the accompanying drawings which illustrate an embodiment by way of a non-limiting example.

In the drawings:

FIG. 2 is a cross-sectional view of the shock absorbing device of FIG. 1 taken on line II—II of FIG. 3;

FIG. 3 is an axial sectional view of the shock absorbing device taken on line III—III of FIG. 2;

FIG. 4 is an axial sectional view of the shock absorbing device taken on line IV-IV of FIG. 2 ;

FIG. 5 is a cross-sectional view in the same plane as FIG. 2, showing the shoes in the position of maximum radial separation from the cam at the end of the absorption of the shock;

Figure 1:
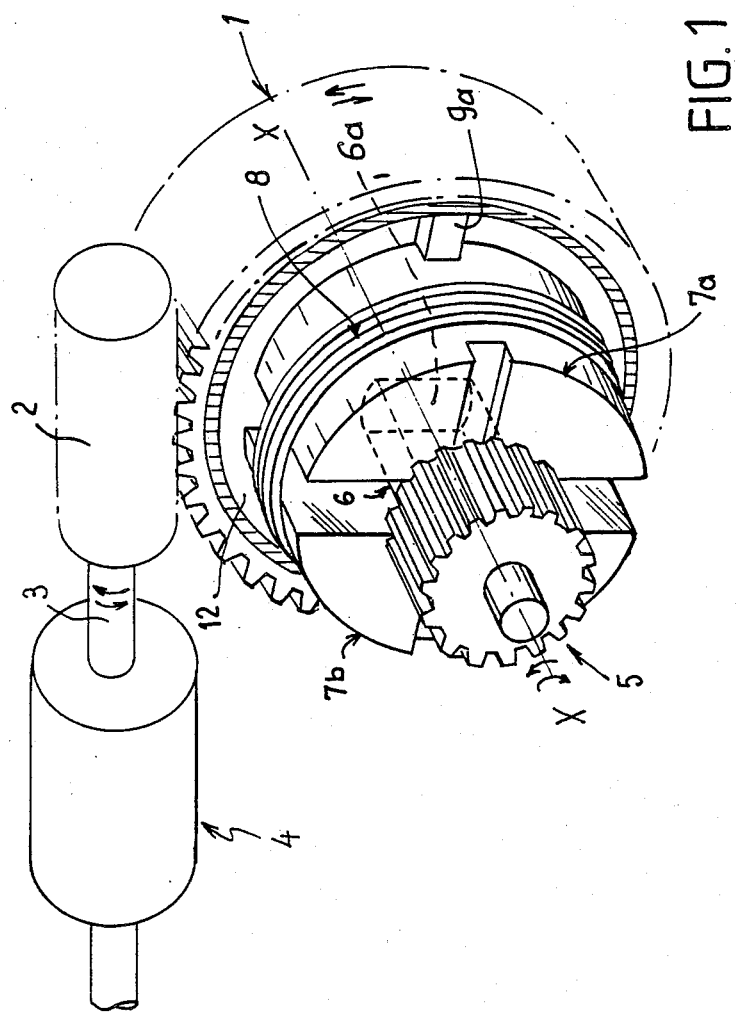
FIG. 1 is a partial perspective view of an electrical motor-speed reducer unit, a worm wheel and a driving worm associated with the wheel, including a shock absorbing device according to one embodiment of the invention.

The device shown in FIG. 1 is intended for driving accessories in motor vehicles, this device being for example part of a window glass raiser.

It comprises a worm wheel 1 engaged with a worm 2 coupled for rotation with the output shaft 3 of the armature 4 of an electrical motor-speed reducer unit, a gear pinion 5 associated with the worm wheel 1 and coaxial with the latter, and means interposed between the pinion 5 and the wheel 1 for absorbing the driving torque of the wheel 1 when the accessory (which will be hereinafter assumed to be a window glass) driven by the rotation of the pinion 5 and by intermediate elements (not shown) known per se, reaches an end-of-travel abutment and stops the rotation of the pinion 5.

The assembly comprising the motor-speed reducer unit and the worm 2 is well known per se and therefore need not be represented in more detail, the same being true of the elements between the pinion 5 and the window glass actuated by this device.

The shock absorbing means comprise a cam 6 fixed to the end of the gear pinion 5 adjacent to the worm wheel 1 and having two opposed surfaces 6a, 6b, a pair of similar shoes 7a, 7b disposed in such manner as to bear against the respective surfaces 6a, 6b of the cam 6 and held against these surfaces by an annular metal spring 8 which is coaxial with the pinion 5 and the wheel 1 and surrounds the two shoes 7a, 7b. In addition, the shock absorbing device comprises elements connected to the wheel 1 and cooperative with the shoes 7a, 7b in such manner as to transmit to the latter and to the cam 6 and pinion 5 the driving torque of the wheel 1. Thus, the shock absorbing device comprising the cam 6 fixed to the end of the pinion gear 5 and held to cam surfaces 6a and 6b by spring 8 cooperates with the shoes 7a and 7b to absorb the shock of the driving torque when the driving accessory, e.g. the window glass operating accessory reahces an end-of-travel abutment and stops rotation of the pinion gear.

In the illustrated embodiment, the aforementioned elements comprise two pairs of keys 9a, 9b; 9'a, 9'b mounted on the wheel 1 or being an integral part of the latter. These pairs of keys are diametrically opposed and project from the interior surface of the wheel 1 and engaged radially in corresponding cavities (11a, 11b for the keys 9a and 9b) provided in the respective shoes 7a, 7b. An annular gap 12 is provided between the shoes 7a, 7b and an interior wall 13 of the wheel 1. As a modification, the number of keys may vary, and may for example be reduced to two keys, which are suitably positioned and dimensioned.

The cam 6 is preferably in a single piece with the gear pinion 5 which is of treated steel. Its two surfaces 6a, 6b are planar in the illustrated embodiment and parallel to the general axis X—X of the wheel 1 and pinion 5. However, as a modification, the surfaces 6a, 6b may be slightly curved and convex, the profile of these surfaces being a function of the desired shock absorbing law.

In the presently-described embodiment, each of the shoes 7a, 7b is in the shape of a semi-cylinder whose diametrical surface bears against the corresponding surface of the cam 6 and is held against this surface by the metal spring 8.

Further, in the embodiment shown in the drawings, plates 14a, 14b of a hard material are interposed between the respective bearing surfaces 6a, 6b of the cam 6 and the interior surfaces of the shoes 7a,7b, in which interior surfaces are provided cavities each receiving a plate 14a, 14b. The shoes 7a, 7b are then preferably made from a suitable plastic material such as polyamide with a glass filler, and the plates 14a, 14b are of treated and hardened steel, namely hardened carbonitrided sheet metal also know as nitrided carbon steel or of a material having an equivalent hardness.

The worm wheel 1 is provided with a side wall 15 through which extends the end portion 16 of the cam 6 which is engaged in a semi-housing 17 constituting a cover for the mechanism, while the opposite end of the cam is engaged in a complementary output semi-housing 18. A bearing bush 19 is interposed between the cam 6 and the semi-housing 18.

As a modification, the plates 14a, 14b may be eliminated, the shoes 7a, 7b being then made from treated steel (sintered steel), the cam 6 being, on the other hand, still made from a material such as treated steel owing to the high pressures to which it is subjected.

The shock absorbing device just described operates in the following manner:

When the driver of the vehicle wishes to raise or lower the accessory (for example the window glass), he brings into operation the motor-speed reducer unit in the desired direction so that the armature 4 drives in rotatior the worm wheel 1 in the corresponding direction throug the shaft 3 and the worm 2. The wheel 1 drives in rotation the gear pinion 5 through the keys 9a . . . , the shoes 7a, 7b and the cam 6.

When the glass reaches an end-of-travel abutment, the rotation of the pinion 5 and the cam 6 is prevented, for example in the angular position seen in FIG. 5. However, the motor-speed reducer unit continues to drive the worm wheel 1 in rotation until the driver has ceased to depress the control push-button.

Consequently, the keys 9a, 9b; 9'a, 9'b exert on the shoes 7a, 7b a torque which tends to continue to drive the latter in rotation. But as the cam 6 is prevented from rotating, it prevents the shoes 7a, 7b from rotating so that the latter can only slide radially on the keys by bearing against the corresponding surfaces 6a, 6b of the cam 6 and by spreading apart from each other. This radial displacement occurs in opposition to the return force exerted by the metal spring 8 which is expanded while the shoes 7a,7b approach the interior wall 13 of the worm wheel 1. At the end of the shock absorption, the elements of the shock absorbing device occupy the position shown in FIG. 5, in which it can be seen that the plates 14a, 14b are no longer applied against the surfaces 6a, 6b of the cam 6 with which they make a large angle.

When the motor-speed reducer unit is stopped, the spring 8 returns the shoes 7a, 7b and the plates 14a,14b to their initial positions with respect to the cam 6.

Figure 6:
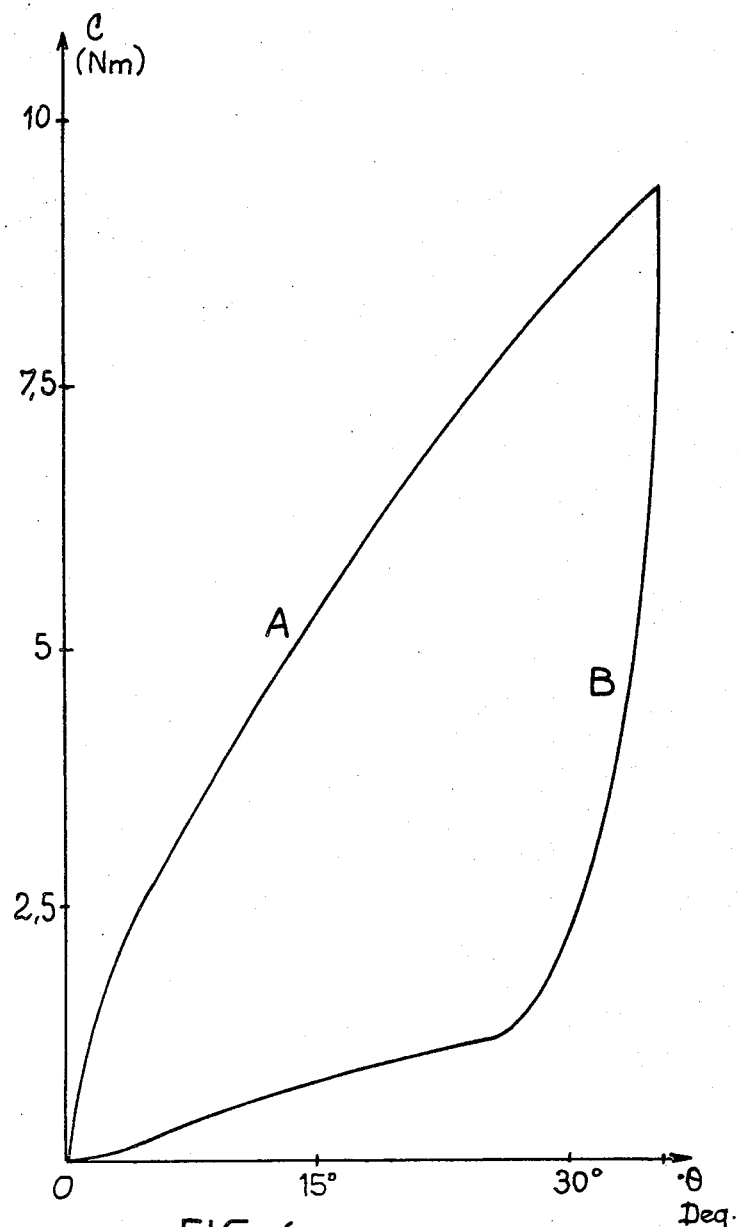
FIG. 6 is a diagram showing the hysteresis curve of the shock absorbing device illustrated in FIGS. 1 to 5.

FIG. 6 shows a numerical example of the hysteresis cycle of a shock absorbing system according to the invention, the torque (in Nm) being plotted as ordinates and the angular spreading apart of the shoes from the cam 6 being plotted as abscissae.

The part A of this curve corresponds to the forward travel of the shock absorbing device while the part B corresponds to the return travel.

As indicated before, the shock absorbing device according to the invention is rendered completely insensitive to variations in temperature and to creep owing to the presence of the metal spring 8. Further, it is not liable to be subjected to a collapse of its surface at the end of a certain period of use, as occurs with known shock absorbers, so that any resulting play at the end of the travel of the glass is avoided.

What is claimed is:

1. A torque shock absorbing device in an electrical motor speed reducer unit for raising the window in a motor vehicle comprising:

a worm wheel;

a worm gear engaging said worm wheel;

an output shaft of said motor speed reducer unit coupled to said worm gear;

a gear pinion associated with said worm wheel to drive the window;

shock absorbing means interposed between said gear pinion and said worm wheel to absorb the shock from the worm wheel torque when the window raising unit comes to an end of travel and stops the rotation of said gear pinion;

said shock absorbing means comprising a cam fixed to an end of the gear pinion adjacent said worm wheel, said cam having two opposed surfaces, and a pair of shoes disposed in bearing relation to the opposed surfaces of the cam;

hard plates being interposed between the bearing surfaces of said cam and said shoes, said hard plates being made of hardened nitrided carbon steel;

said shoes being made of polyamide plastic with glass filler;

an annular metal spring coaxial with said gear pinion and said worm wheel, said spring surrounding said pair of shoes and biassing said shoes against the surfaces of said cam;

keys driven by said worm wheel which transmit the driving torque of the worm wheel to said shoes, to said cam and to said gear pinion, said shoes being provided with cavities for engaging said keys; and an annular gap between said shoes and the interior wall of said worm wheel and said keys projecting beyond said interior wall of said worm wheel whereby the gear pinion and the cam are prevented from rotating at the end of travel of the window raising unit and the torque which is transmitted to the shoes causes the shoes to spread apart radially and expand said spring while bearing against said cam.

2. A torque shock absorbing device as claimed in claim 1 wherein said cam has planar surfaces.

* * * * *